(No Model.)
W. J. WALKER.
PIPE CONNECTION.
No. 524,051. Patented Aug. 7, 1894.
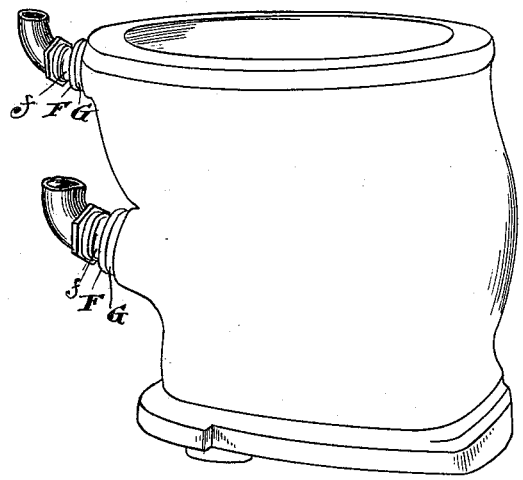
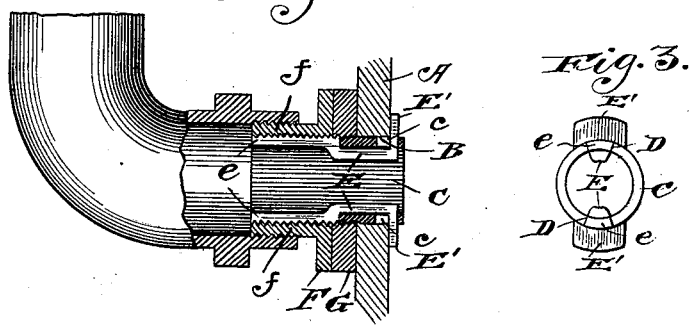
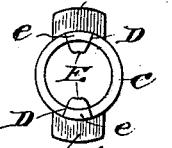
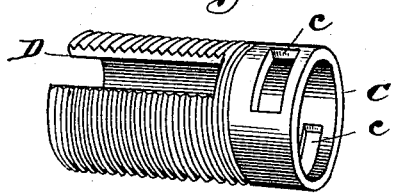
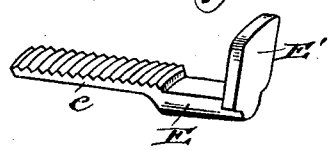
Witnesses,
Inventor,
William J. Walker
By Offield, Towle & Linthicum
Att'ys.

UNITED STATES PATENT OFFICE.

WILLIAM J. WALKER, OF CHICAGO, ILLINOIS.

PIPE CONNECTION.

SPECIFICATION forming part of Letters Patent No. 524,051, dated August 7, 1894.

Application filed February 10, 1894. Serial No. 499,800. (No model.)

*To all whom it may concern:*

Be it known that I, WILLIAM J. WALKER, of Chicago, Illinois, have invented certain new and useful Improvements in Pipe Connections, of which the following is a specification.

This invention relates to certain improvements in pipe connections, and particularly to that class of connections wherein threaded nipples are secured to vessels or reservoirs, whereby communication with a pipe system is established. The connection may also be applied to receptacles for liquids whereby to secure faucets, &c.

The invention consists in a pipe section, externally threaded toward its outer end, having apertures or cut away portions at or near its inner end and slotted at its outer end whereby to adjust removable key sections, said key sections consisting of threaded metal segments adapted to be seated within the slots in the outer end of the pipe and having shoulders adapted to impinge the inside of the wall of the vessel when applied thereto through a suitable aperture therein. A nut having an externally threaded flange, and a suitable washer afford means for securing the several parts with the receptacle. The pipe, coupling or faucet is then secured with the threaded flange of the nut.

The principal object of the invention is to furnish a suitable stud for pipe connection with vessels or reservoirs, that is readily secured therewith without the necessity of using cement or solder, and that can be quickly applied thereto or removed therefrom without injury to the several parts.

In the accompanying drawings, Figure 1 is a perspective view showing the application of my invention applied in connection with a flush pipe. Fig. 2 is an enlarged sectional detail. Fig. 3 is an end view of the pipe section and keys. Fig. 4 is a perspective view of the pipe section. Fig. 5 is a perspective view of one of the keys.

In the drawings, A represents the wall of a receptacle having an aperture B, through which aperture a short pipe section C is inserted, said pipe being externally threaded toward its outer end and having apertures c, c and slots D, D at its inner and outer ends, respectively.

Keys E are provided with shoulders E' that project through the apertures c in the pipe, and whose shanks e lie in the slots D and complete the circumference of the pipe, said shanks having serrations thereon which register with the threads cut upon the pipe.

F is a nut having an externally threaded flange f upon which flange pipe connection is secured. A washer G composed of rubber or other suitable packing substance is interposed between the nut and the wall of the receptacle, thereby insuring a perfectly tight joint.

From the foregoing description it will be readily seen that a water tight connection with a reservoir or earthen receptacle and a system of pipes or other fixtures may be quickly and economically obtained.

One of the advantages of this invention is that it enables a connection to be made to a bowl having the usual neck or nipple, or to a bowl having straight or plane sides. The importance of this matter will be appreciated when it is understood that in the manufacture and use of earthen ware bowls, the loss due to the breaking of the necks or nipples, or "horns" as they are called generally, is very considerable.

By my invention the bowls may be made without such necks or nipples, or if provided with them and they be broken off the connection may be made to the aperture and a secure joint made, where, in the absence of this invention, the bowl would have to be thrown away. The adaptability of my improved coupling to any aperture renders the invention valuable in that it makes unnecessary the construction of bowls with special provision for attaching the pipes, and enables the repair of broken bowls which has hitherto been impossible.

Without limiting myself to precise details of construction, I claim—

1. A pipe connection comprising a pipe section externally threaded at one end and provided with slots in its threaded portion and with openings in its wall separated from said slots by unsevered portions of the section, keys having heads to project through the openings, bodies which span the unsevered portions between the slots and the openings and externally threaded shanks adapted to enter the slots, and a threaded nut adapted to engage the threads of the pipe section and keys, substantially as described.

2. A pipe connection, comprising in combination a pipe section externally threaded at its outer end and having slots and apertures in its wall, keys having heads and shanks adapted to enter the apertures and slots in the wall of said pipe, a nut having an internally and externally threaded flange, the internal threads adapted to traverse the external threads of the pipe section and the external threads affording means for pipe connection, and a washer whereby a water tight connection is secured with a reservoir, substantially as described.

3. A pipe connection, comprising in combination a pipe section externally threaded at its outer end and having slots and apertures in its wall, keys having heads and shanks adapted to enter the apertures and slots in the wall of said pipe, said shanks having serrations that register with the threads cut upon the pipe, a nut having an internally and externally threaded flange, the internal threads adapted to traverse the threads of the pipe section and the external threads affording means for pipe connection, and a washer whereby a water tight connection is secured with a reservoir, substantially as described.

WILLIAM J. WALKER.

Witnesses:
FREDERICK C. GOODWIN,
N. M. BOND.